United States Patent
Syvänne et al.

(10) Patent No.: US 10,805,420 B2
(45) Date of Patent: Oct. 13, 2020

(54) PROXY-LESS WIDE AREA NETWORK ACCELERATION

(71) Applicant: Forcepoint LLC, Austin, TX (US)

(72) Inventors: Tuomo Syvänne, Helsinki (FI); Olli-Pekka Niemi, Helsinki (FI); Valtteri Rahkonen, Helsinki (FI); Ville Mattila, Helsinki (FI)

(73) Assignee: Forcepoint LLC, Austin, TX (US)

( * ) Notice: Subject to any disclaimer, the term of this patent is extended or adjusted under 35 U.S.C. 154(b) by 218 days.

(21) Appl. No.: 15/825,481

(22) Filed: Nov. 29, 2017

(65) Prior Publication Data

US 2019/0166220 A1  May 30, 2019

(51) Int. Cl.
*H04L 29/08* (2006.01)
*H04L 29/06* (2006.01)
(Continued)

(52) U.S. Cl.
CPC .... *H04L 67/2847* (2013.01); *G06F 16/24568* (2019.01); *H04L 45/04* (2013.01); *H04L 45/24* (2013.01); *H04L 47/125* (2013.01); *H04L 49/90* (2013.01); *H04L 63/0272* (2013.01); *H04L 12/2854* (2013.01); *H04L 69/04* (2013.01)

(58) Field of Classification Search
CPC . H04L 67/2847; H04L 63/0272; H04L 49/90; H04L 69/04; H04L 12/2854; G06F 16/24568
See application file for complete search history.

(56) References Cited

U.S. PATENT DOCUMENTS

| | | | | |
|---|---|---|---|---|
| 6,148,391 A | * | 11/2000 | Petrick | G06F 9/30105 711/109 |
| 6,226,680 B1 | * | 5/2001 | Boucher | G06F 5/10 709/230 |

(Continued)

FOREIGN PATENT DOCUMENTS

| | | | | |
|---|---|---|---|---|
| CN | 101729354 A | * | 6/2010 | ......... H04L 12/4633 |
| JP | 2013034063 A | * | 2/2013 | |

(Continued)

OTHER PUBLICATIONS https://tools.ietf.org/html/rfc2018 (Year: 1996).*

(Continued)

*Primary Examiner* — Kostas J Katsikis
(74) *Attorney, Agent, or Firm* — Jackson Walker L.L.P.

(57) ABSTRACT

A method, system, and computer-usable medium are disclosed for network acceleration, comprising: responsive to receiving at an acceleration device a stream of one or more datagrams from a sending endpoint device within a first local area network of the acceleration device, the stream for transmission to a receiving endpoint device within a second local area network coupled to the first local area network by a wide area network: communicating by the acceleration device to the sending endpoint device a respective acknowledgement to each of the one or more datagrams; and transmitting by the acceleration device the one or more datagrams via multiple communication links of the wide area network to a second acceleration device within the second local area network and coupled to the receiving endpoint device.

24 Claims, 3 Drawing Sheets

(51) Int. Cl.
*H04L 12/861* (2013.01)
*G06F 16/2455* (2019.01)
*H04L 12/715* (2013.01)
*H04L 12/707* (2013.01)
*H04L 12/803* (2013.01)
*H04L 12/28* (2006.01)

(56) References Cited

U.S. PATENT DOCUMENTS

| | | | | |
|---|---|---|---|---|
| 6,526,581 | B1* | 2/2003 | Edson | H02J 7/0065 348/552 |
| 7,360,083 | B1* | 4/2008 | Ragireddy | H04L 63/0428 713/160 |
| 7,653,075 | B2* | 1/2010 | Singh | H04L 12/4633 370/351 |
| 7,873,060 | B2* | 1/2011 | Luo | H04L 12/4633 370/401 |
| 8,072,898 | B2* | 12/2011 | Viger | H04L 47/193 370/252 |
| 8,433,783 | B2* | 4/2013 | Jackowski | H04L 47/19 370/469 |
| 8,503,332 | B2* | 8/2013 | Luo | H04L 12/4633 370/254 |
| 8,605,605 | B1* | 12/2013 | Vadlakonda | H04L 43/0894 370/252 |
| 8,837,472 | B2* | 9/2014 | Viger | H04L 12/4633 370/389 |
| 9,009,322 | B1* | 4/2015 | Molleti | H04L 45/125 709/224 |
| 9,027,129 | B1* | 5/2015 | Kancherla | H04L 63/1458 726/22 |
| 9,065,866 | B2* | 6/2015 | Agarwal | H04L 67/2814 |
| 9,172,603 | B2* | 10/2015 | Padmanabhan | H04L 41/0823 |
| 9,397,857 | B2* | 7/2016 | Gross, IV | H04L 47/31 |
| 9,548,936 | B2* | 1/2017 | Lee | H04L 47/28 |
| 9,755,731 | B2* | 9/2017 | Li | H04B 7/18513 |
| 10,419,519 | B2* | 9/2019 | Yamamura | H04L 67/06 |
| 2003/0014544 | A1* | 1/2003 | Pettey | H04L 29/06 709/249 |
| 2004/0042487 | A1* | 3/2004 | Ossman | H04L 29/06 370/466 |
| 2004/0052257 | A1* | 3/2004 | Abdo | H04L 43/00 370/392 |
| 2007/0244987 | A1* | 10/2007 | Pedersen | H04L 67/34 709/217 |
| 2009/0007152 | A1* | 1/2009 | Cahill | G06F 9/4411 719/321 |
| 2009/0144440 | A1* | 6/2009 | Subbanna | H04L 12/2854 709/233 |
| 2009/0213850 | A1* | 8/2009 | Viger | H04L 47/10 370/389 |
| 2010/0098092 | A1* | 4/2010 | Luo | H04L 12/4633 370/401 |
| 2010/0232440 | A1* | 9/2010 | Basavaiah | H04L 49/357 370/401 |
| 2010/0235521 | A1* | 9/2010 | French | G06F 15/16 709/228 |
| 2011/0141904 | A1* | 6/2011 | Viger | H04L 47/196 370/241 |
| 2012/0163385 | A1* | 6/2012 | Lee | H04L 47/17 370/392 |
| 2012/0213210 | A1* | 8/2012 | Thomasson | H04B 7/18528 370/337 |
| 2013/0163428 | A1* | 6/2013 | Lee | H04L 47/28 370/235 |
| 2014/0082180 | A1* | 3/2014 | Mutoh | H04L 47/193 709/224 |
| 2015/0382240 | A1* | 12/2015 | Hecht | H04L 69/22 370/316 |
| 2016/0006645 | A1* | 1/2016 | Rave | H04L 12/2854 709/203 |
| 2016/0197835 | A1* | 7/2016 | Luft | H04L 12/46 709/223 |
| 2018/0295134 | A1* | 10/2018 | Gupta | H04L 63/10 |

FOREIGN PATENT DOCUMENTS

JP   5747280 B2 * 7/2015
WO   WO-2011000307 A1 * 1/2011 ......... H04B 7/18586

OTHER PUBLICATIONS https://tools.ietf.org/html/rfc1323 (Year: 1992).*
James E. Goldman, Firewalls, The Internet Encyclopedia, Apr. 15, 2004 (Year: 2004).*

* cited by examiner

PROXY-LESS WIDE AREA NETWORK ACCELERATION

FIELD OF DISCLOSURE

The present invention relates in general to the field of computers and similar technologies, and in particular to software utilized in this field. Still more particularly, it relates to a method, system and computer-usable medium for accelerating network communication in order to improve network security.

BACKGROUND

Many existing network firewalls and gateways are capable of implementing multilink topologies and Virtual Private Network (VPN) technologies, thus allowing for secure wide area network (WAN) connectivity between two endpoints. However, using existing technologies, endpoints that communicate to each other using a WAN communicate directly to each other through the WAN, which in turn may have an adverse effect on connection throughput and latency, preventing full saturation of WAN links. Accordingly, systems and methods which improve throughput and decrease latency may be desirable.

SUMMARY

In accordance with the teachings of the present disclosure, certain disadvantages and problems associated with existing approaches to network traffic transmission have been reduced or eliminated.

In accordance with embodiments of the present disclosure, a computer-implementable method for securing network communication may include, responsive to receiving at an acceleration device, a stream of one or more datagrams from a sending endpoint device within a first local area network of the acceleration device, the stream for transmission to a receiving endpoint device within a second local area network coupled to the first local area network by a wide area network: communicating by the acceleration device to the sending endpoint device a respective acknowledgement to each of the one or more datagrams; and transmitting by the acceleration device the one or more datagrams via multiple communication links of the wide area network to a second acceleration device within the second local area network and coupled to the receiving endpoint device.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations. The computer program code may be executable by the processor and configured for, responsive to receiving at an acceleration device a stream of one or more datagrams from a sending endpoint device within a first local area network of the acceleration device, the stream for transmission to a receiving endpoint device within a second local area network coupled to the first local area network by a wide area network: communicating by the acceleration device to the sending endpoint device a respective acknowledgement to each of the one or more datagrams; and transmitting by the acceleration device the one or more datagrams via multiple communication links of the wide area network to a second acceleration device within the second local area network and coupled to the receiving endpoint device.

In accordance with these and other embodiments of the present disclosure, a non-transitory, computer-readable storage medium embodying computer program code may be disclosed, the computer program code comprising computer executable instructions configured for, responsive to receiving at an acceleration device a stream of one or more datagrams from a sending endpoint device within a first local area network of the acceleration device, the stream for transmission to a receiving endpoint device within a second local area network coupled to the first local area network by a wide area network: communicating by the acceleration device to the sending endpoint device a respective acknowledgement to each of the one or more datagrams; and transmitting by the acceleration device the one or more datagrams via multiple communication links of the wide area network to a second acceleration device within the second local area network and coupled to the receiving endpoint device.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a mobile device such as a tablet or smartphone, a connected "smart device," a network appliance, a network storage device, or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more communications ports for communicating with networked devices, external devices, and various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
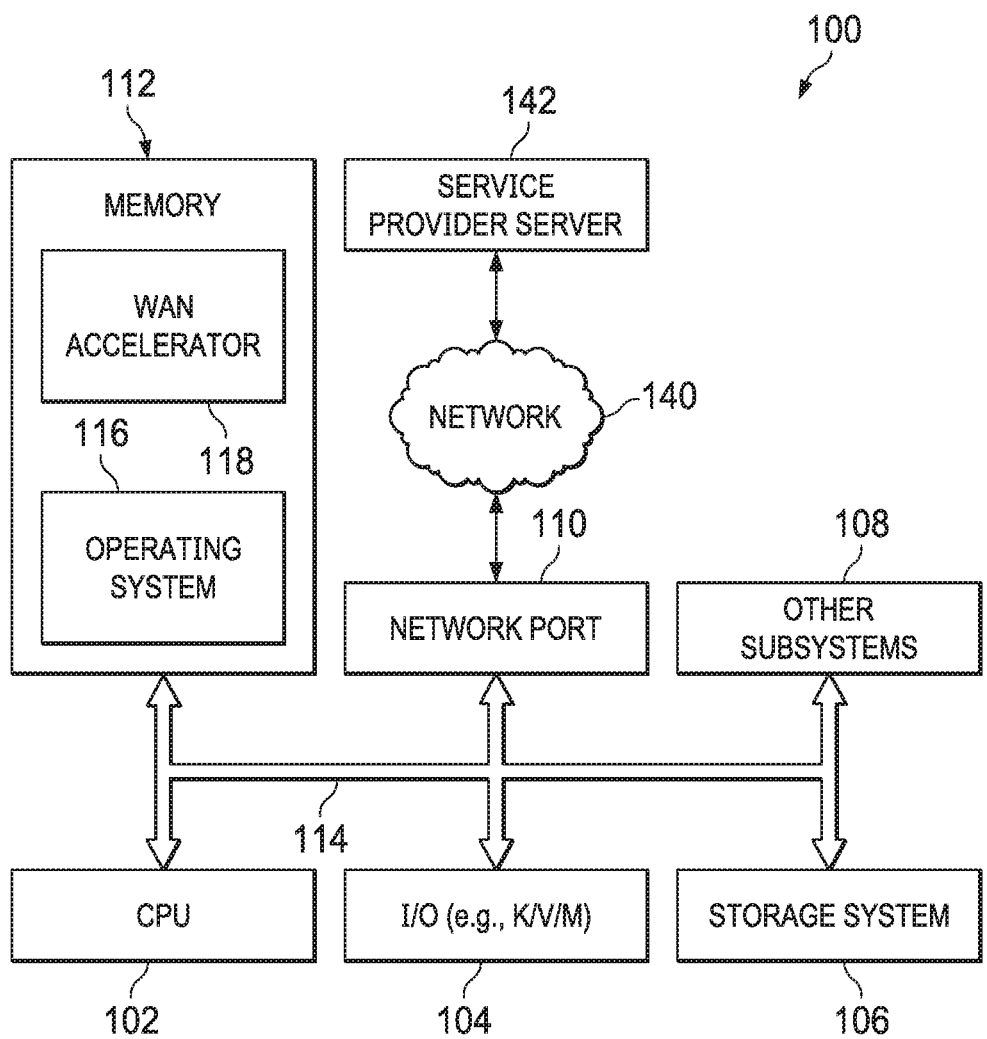
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a WAN accelerator 118. In some embodiments, information handling system 100 may be able to download WAN accelerator 118 from service provider server 142. In other embodiments, WAN accelerator 118 may be provided as a service from the service provider server 142.

In various embodiments, download WAN accelerator 118 may perform WAN acceleration of network communications between two endpoint devices of a network, as described in greater detail elsewhere in this disclosure. In some embodiments, WAN accelerator 118 and the functionality thereof improves processor efficiency, and thus the efficiency of information handling system 100, by performing WAN acceleration with decreased processing resources as compared to existing approaches for communicating information over a network. In these and other embodiments, WAN accelerator 118 and the functionality thereof may improve an efficiency (e.g., increased throughput, decrease latency), and thus the effectiveness of information handling system 100, by enabling network communication between endpoints with greater effectiveness than existing approaches for network communication. As will be appreciated, once information handling system 100 is configured to perform the functionality of WAN accelerator 118, information handling system 100 becomes a specialized computing device specifically configured to perform the functionality of WAN accelerator 118 and is not a general purpose computing device. Moreover, the implementation of functionality of WAN accelerator 118 on information handling system 100 improves the functionality of information handling system 100 and provides a useful and concrete result of improving network communications by performing network acceleration using proxy-less WAN acceleration.

Figure 2:
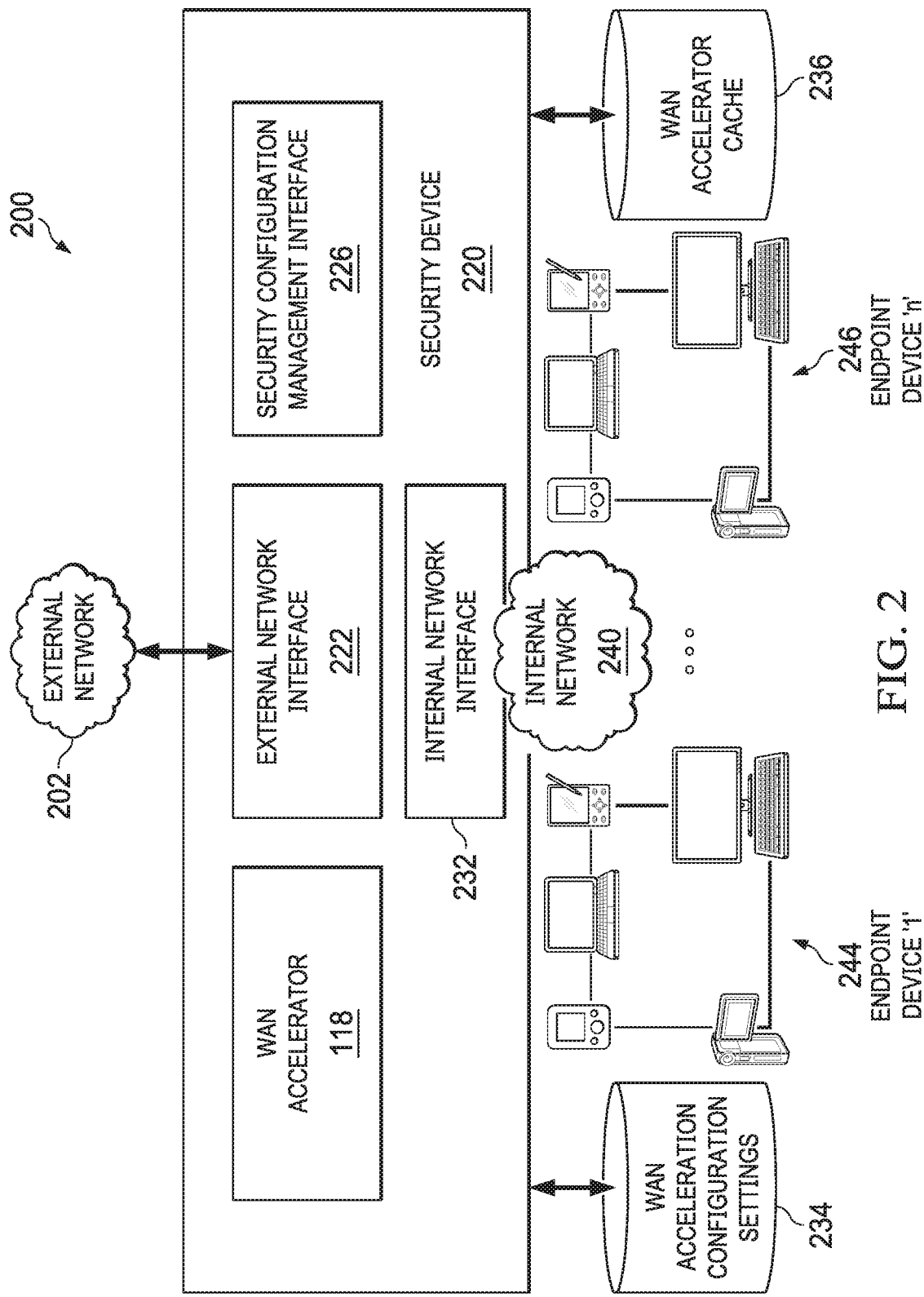
FIG. 2 illustrates a block diagram of a system for performing proxy-less WAN acceleration, in accordance with embodiments of the present disclosure.

FIG. 2 illustrates a block diagram of a system for performing deep packet inspection using cached inspection results, in accordance with embodiments of the present disclosure. In some embodiments, a security device 220 may include an external network interface 222, a security configuration management interface 226, and a WAN accelerator 118. Security device 220 may be implemented using any suitable information handling system 100, including without limitation a firewall, an intrusion prevention system, an intrusion detection system, or any other suitable security device capable of implementing WAN accelerator 118. In some embodiments, security device 220 may be implemented as an individual security device 220, a virtual context security device 220, or a security device 220 cluster.

Security device 220 may also include in some embodiments a repository of deep packet inspection configuration settings 234 and a deep packet inspection cache 236. In some embodiments, firewall configuration management interface 226 may be implemented to receive deep packet inspection configuration instructions from WAN accelerator 118.

Security device 220 may also include in some embodiments a repository of WAN accelerator configuration settings 234 and a WAN accelerator cache 236. In some embodiments, firewall configuration management interface 226 may be implemented to receive WAN acceleration configuration instructions from WAN accelerator 118.

Skilled practitioners of the art will be familiar with multicast, which is commonly used in a network environment for simultaneously providing Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a personal digital assistant (PDA), a smart phone, a mobile telephone, a digital camera, a video camera, or other device capable of storing, processing and communicating data via a network, such as an internal network 240. In various embodiments, the communication of the data may take place in real-time or near-real-time.

Embodiments of the invention may reflect an appreciation that network communication may represent an efficient means for communicating useful information. However, those of skill in the art will likewise appreciate that existing technologies do not provide full saturation of WAN links for communication of network traffic between endpoints. Those of skill in the art may appreciate that traditional approaches to WAN communication allow for accurate communication, but with undesirable throughput and latency.

In operation, WAN accelerator 118 may perform proxy-less acceleration of communication between endpoints of a network which have a WAN interfaced between the endpoints. As described in greater detail elsewhere in this disclosure, WAN accelerator 118 may be configured to maximize WAN communication throughput and minimize WAN communication latency by, when on the transmission end of a network communication, actively acknowledging data transmitted by the transmitting endpoint and compressing the data stream, and by, when on the receiving end of a network communication, providing for decompression and reassembling of a data stream. In addition, WAN accelerators 118 on both the receive end and transmission end of a data stream may provide for fast retransmit and error recovery of data, as also described in greater detail below.

Figure 3:
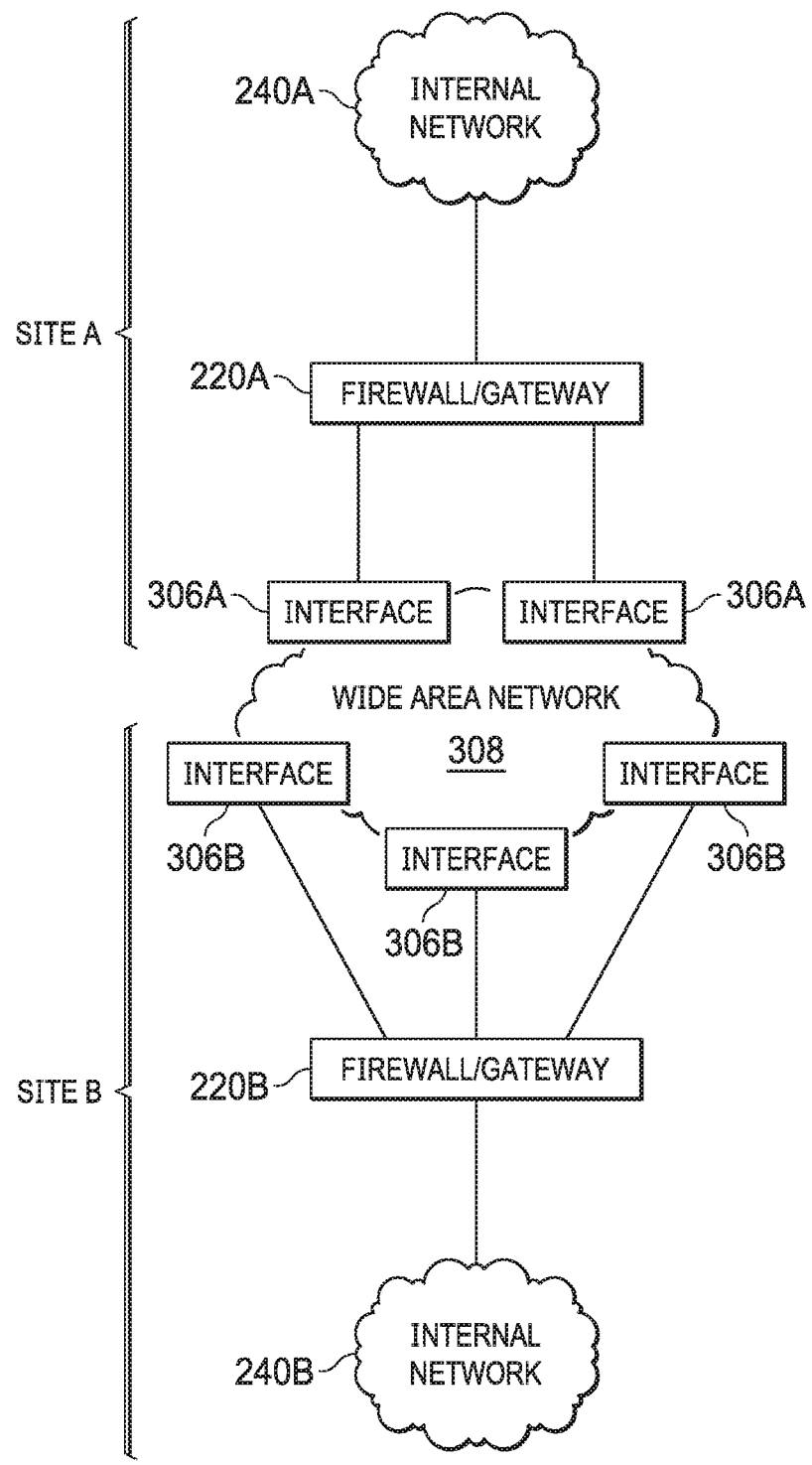
FIG. 3 illustrates a block diagram of an example network in which a VPN may be implemented, in accordance with embodiments of the present disclosure.

FIG. 3 illustrates a block diagram of an example network 300 in which a VPN may be implemented, in accordance with embodiments of the present disclosure. As shown in FIG. 3, network 300 may include a first site labeled as site A that may include internal network 240A, a firewall/gateway 220A, and one or more interfaces 306A. Network 300 may similarly include a second site labeled as site B that may include internal network 240B, a firewall/gateway 220B, and one or more interfaces 306B. Interfaces 306A may be coupled to interfaces 306B via a WAN 308. In some embodiments, WAN 308 my comprise the Internet and interfaces 306A and 306B may comprise Internet service providers (ISPs). In other embodiments, WAN 308 may comprise a multiple-protocol label switching network, a network of leased lines, or any other suitable network.

Each of internal network 240A and 240B may include an instance of an internal network 240 of FIG. 2, and thus, may include one or more endpoint devices of which network devices 244 and 246 are examples. In addition, each of firewall/gateway 220A and 220B may include an instance of a firewall/gateway 220 of FIG. 2, and thus, may implement or otherwise include an instance of a WAN accelerator 118. Although FIG. 3 illustrates one possible topology for network 300 which is configured as a multi-interface (e.g., multi-ISP) VPN, network 300 may be implemented in other topologies, including those in which one or both of sites A and B include only a single interface 306A/306B, and/or including those in which a cluster of firewalls/gateways 304A/304B is used in lieu of a single firewall/gateway 304A/304B.

In operation, skilled practitioners in the art may recognize that the various components of network 300 may be used to implement secured multi-link communication between a single endpoint within internal network 240A and a single endpoint within internal network 240B, in that communication between the single endpoint of network 240A and the single endpoint of network 240B may be simultaneously routed over multiple links of wide area network 308 in order to provide communication with high availability and high bandwidth. However, as mentioned above, skilled practitioners may appreciate that existing approaches to multi-link communication may not allow for full saturation of the various links present in a wide area network.

In operation, a firewall/gateway 220 (e.g., 220A or 220B) may be capable of functioning both as a transmit-side firewall/gateway 220 and a receive-side firewall gateway 220. For example, in a transmission from an endpoint within internal network 240A to an endpoint within internal network 240B, firewall/gateway 220A would be considered the transmit-side firewall/gateway 220 for such transmission and firewall/gateway 220B would be considered the receive-side firewall/gateway 220 for such transmission. Similarly, in a transmission from an endpoint within internal network 240B to an endpoint within internal network 240A, firewall/gateway 220B would be considered the transmit-side firewall/gateway 220 for such transmission and firewall/gateway 220A would be considered the receive-side firewall/gateway 220 for such transmission.

When functioning as a transmit-side firewall/gateway 220, a firewall/gateway 220 may be configured to, upon receipt of a datagram from an endpoint at the same LAN site of the transmit-side firewall/gateway 220 for transmission to another LAN site via WAN 308, communicate an acknowledgement of the transmitted datagram to the endpoint. By actively acknowledging datagrams, rather than traditional approaches in which acknowledgments are communicated from the receiving endpoint of a transmission, transmit-side firewall/gateway 220 may cause the transmitting endpoint at the site of transmit-side firewall/gateway 220 to more quickly transmit a stream of datagrams to transmit-side firewall/gateway 220, as the transmitting endpoint may "think" that datagrams are being successfully received by the receiving endpoint at the other site.

After acknowledging datagrams received from the transmitting endpoint, the transmit-side firewall/gateway 220 may immediately compress and appropriately balance the datagram traffic among the links of WAN 308 without buffering and/or ordering the traffic as may be required in existing proxy-based approaches. The transmit-side firewall/gateway 220 may also, in the event of full saturation of communication links of WAN 308, queue datagrams (e.g., within WAN accelerator cache) for communication via WAN 308.

Further, the transmit-side firewall/gateway 220 may store datagrams to be communicated over WAN 308 in an appropriate window or buffer (e.g., a Transmission Control Protocol or "TCP" window) until such time as an acknowledgment of such datagrams has been received by the transmit-side firewall/gateway 220 from the receive-side firewall/gateway 220 via WAN 308. Accordingly, in the event of datagram loss within WAN 308, the transmit-side firewall/gateway 220 may be able to perform a retransmit of lost datagrams to the receive-side firewall/gateway 220.

When functioning as a receive-side firewall/gateway 220, a firewall/gateway 220 may be configured to, upon receipt of a datagram from the transmit-side firewall/gateway 220 via WAN 308, communicate an acknowledgement of the transmitted datagram to the transmit-side firewall/gateway 220. As datagrams are received by the receive-side firewall/gateway 220, the receive-side firewall/gateway 220 may decompress the datagrams and reorder the datagrams. For example, the receive-side firewall/gateway 220 may reorder the datagrams in an appropriate queue of WAN accelerator cache 236. After datagrams are properly reordered, the receive-side firewall/gateway 220 may communicate the datagrams to the appropriate receiving endpoint. Reordering may be required because multiple links are used and datagrams may arrive out of order.

Further, the receive-side firewall/gateway 220 may implement fast retransmit (e.g. TCP Fast Transmit) and/or error recovery services to recover potential loss of datagrams within WAN 308, as well as maintain a queue (e.g., within WAN accelerator cache 236) of datagrams communicated to but not yet acknowledged by the receiving endpoint, in order to perform retransmission of lost datagrams.

The proxy-less WAN acceleration described herein may provide for improved network communication over that of existing proxy-to-proxy implementation, which requires significant overhead for network traffic, and due to the fact that a proxy by its very nature requires more resource consumption than the proxy-less approach described above, which may be implemented utilizing only standard Transmit Control Protocol/Internet Protocol (TCP/IP) protocols.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for performing proxy-less wide area network acceleration of network traffic, comprising, responsive to receiving at an acceleration device a stream of a plurality of datagrams from a sending endpoint device within a first local area network of the acceleration device, the stream for transmission to a receiving endpoint device within a second local area network coupled to the first local area network by a wide area network, and the stream being received in an initial stream order:
   communicating by the acceleration device to the sending endpoint device a respective acknowledgement to each of the plurality of datagrams, wherein the respective acknowledgements are generated by the acceleration device and do not originate from the receiving endpoint; and
   transmitting by the acceleration device the plurality of datagrams via multiple communication links of the wide area network to a second acceleration device within the second local area network and coupled to the receiving endpoint device, wherein the plurality of datagrams are transmitted in the initial stream order without being reordered by the acceleration device.

2. The method of claim 1, wherein transmitting the plurality of datagrams comprises compressing and balancing the stream among the multiple communication links of the wide area network.

3. The method of claim 1, further comprising queuing by the acceleration device one or more datagrams of the stream responsive to saturation of one or more of the multiple communication links.

4. The method of claim 1, further comprising storing by the acceleration device a datagram of the stream in a window until an acknowledgement of the datagram has been received by the acceleration device from the second acceleration device such that the datagram can be retransmitted from the acceleration device to the second acceleration device via the wide area network in the event of loss of the datagram within the wide area network.

5. The method of claim 1, further comprising, responsive to receiving a second stream of one or more datagrams from the second acceleration device via the wide area network, communicating by the acceleration device to the second acceleration device a respective acknowledgement to each of the one or more datagrams of the second stream.

6. The method of claim 5, further comprising:
   decompressing and reordering, by the acceleration device, the one or more datagrams of the second stream; and
   communicating by the acceleration device the one or more datagrams of the second stream to a second receiving device within the first local area network.

7. The method of claim 6, further comprising:
   maintaining by the acceleration device a queue of datagrams communicated by the acceleration device to the second receiving device but not yet acknowledged by the second receiving device; and
   performing retransmission of datagrams lost in communication from the acceleration device to the second receiving device based on content of the queue.

8. The method of claim 5, further comprising implementing retransmission and error recovery services on the acceleration device to recover loss of one or more datagrams of the second stream within the wide area network.

9. A system comprising:
   a processor; and
   a data bus coupled to the processor;
   wherein the system is configured to, responsive to receiving at the system a stream of a plurality of datagrams from a sending endpoint device within a first local area network of the system, the stream for transmission to a receiving endpoint device within a second local area network coupled to the first local area network by a wide area network, and the stream being received in an initial stream order:
      communicate by the system to the sending endpoint device a respective acknowledgement to each of the plurality of datagrams, wherein the respective acknowledgements are generated by the system and do not originate from the receiving endpoint; and
      transmit by the system the plurality of datagrams via multiple communication links of the wide area network to a remote acceleration device within the second local area network and coupled to the receiving endpoint device, wherein the plurality of datagrams are transmitted in the initial stream order without being reordered by the acceleration device.

10. The system of claim 9, wherein transmitting the plurality of datagrams comprises compressing and balancing the stream among the multiple communication links of the wide area network.

11. The system of claim 9, wherein the system is further configured to queue one or more datagrams of the stream responsive to saturation of one or more of the multiple communication links.

12. The system of claim 9, wherein the system is further configured to store a datagram of the stream in a window until an acknowledgement of the datagram has been received by the system from the remote acceleration device such that the datagram can be retransmitted from the system to the remote acceleration device via the wide area network in the event of loss of the datagram within the wide area network.

13. The system of claim 9, wherein the system is further configured to, responsive to receiving a second stream of one or more datagrams from the remote acceleration device via the wide area network, communicate to the remote acceleration device a respective acknowledgement to each of the one or more datagrams of the second stream.

14. The system of claim 13, wherein the system is further configured to:
 decompress and reorder the one or more datagrams of the second stream; and
 communicate the one or more datagrams of the second stream to a second receiving device within the first local area network.

15. The system of claim 14, wherein the system is further configured to maintain a queue of datagrams communicated by the system to the second receiving device but not yet acknowledged by the second receiving device; and
 perform retransmission of datagrams lost in communication from the system to the second receiving device based on content of the queue.

16. The system of claim 13, wherein the system is further configured to implement retransmission and error recovery services to recover loss of one or more datagrams of the second stream within the wide area network.

17. A non-transitory, computer-readable storage medium embodying computer program code executable for, responsive to receiving at an acceleration device a stream of a plurality of datagrams from a sending endpoint device within a first local area network of the acceleration device, the stream for transmission to a receiving endpoint device within a second local area network coupled to the first local area network by a wide area network, and the stream being received in an initial stream order:
 communicating by the acceleration device to the sending endpoint device a respective acknowledgement to each of the plurality of datagrams, wherein the respective acknowledgements are generated by the acceleration device and do not originate from the receiving endpoint; and
 transmitting by the acceleration device the plurality of datagrams via multiple communication links of the wide area network to a second acceleration device within the second local area network and coupled to the receiving endpoint device, wherein the plurality of datagrams are transmitted in the initial stream order without being reordered by the acceleration device.

18. The storage medium of claim 17, wherein transmitting the plurality of datagrams comprises compressing and balancing the stream among the multiple communication links of the wide area network.

19. The storage medium of claim 17, wherein the code is further for queuing by the acceleration device one or more datagrams of the stream responsive to saturation of one or more of the multiple communication links.

20. The storage medium of claim 17, wherein the code is further for storing by the acceleration device a datagram of the stream in a window until an acknowledgement of the datagram has been received by the acceleration device from the second acceleration device such that the datagram can be retransmitted from the acceleration device to the second acceleration device via the wide area network in the event of loss of the datagram within the wide area network.

21. The storage medium of claim 17, wherein the code is further for, responsive to receiving a second stream of one or more datagrams from the second acceleration device via the wide area network, communicating by the acceleration device to the second acceleration device a respective acknowledgement to each of the one or more datagrams of the second stream.

22. The storage medium of claim 21, wherein the code is further for:
 decompressing and reordering, by the acceleration device, the one or more datagrams of the second stream; and
 communicating by the acceleration device the one or more datagrams of the second stream to a second receiving device within the first local area network.

23. The storage medium of claim 22, wherein the code is further for maintaining by the acceleration device a queue of datagrams communicated by the acceleration device to the second receiving device but not yet acknowledged by the second receiving device; and
 performing retransmission of datagrams lost in communication from the acceleration device to the second receiving device based on content of the queue.

24. The storage medium of claim 21, wherein the code is further for implementing retransmission and error recovery services on the acceleration device to recover loss of one or more datagrams of the second stream within the wide area network.

* * * * *